Patented Nov. 28, 1950

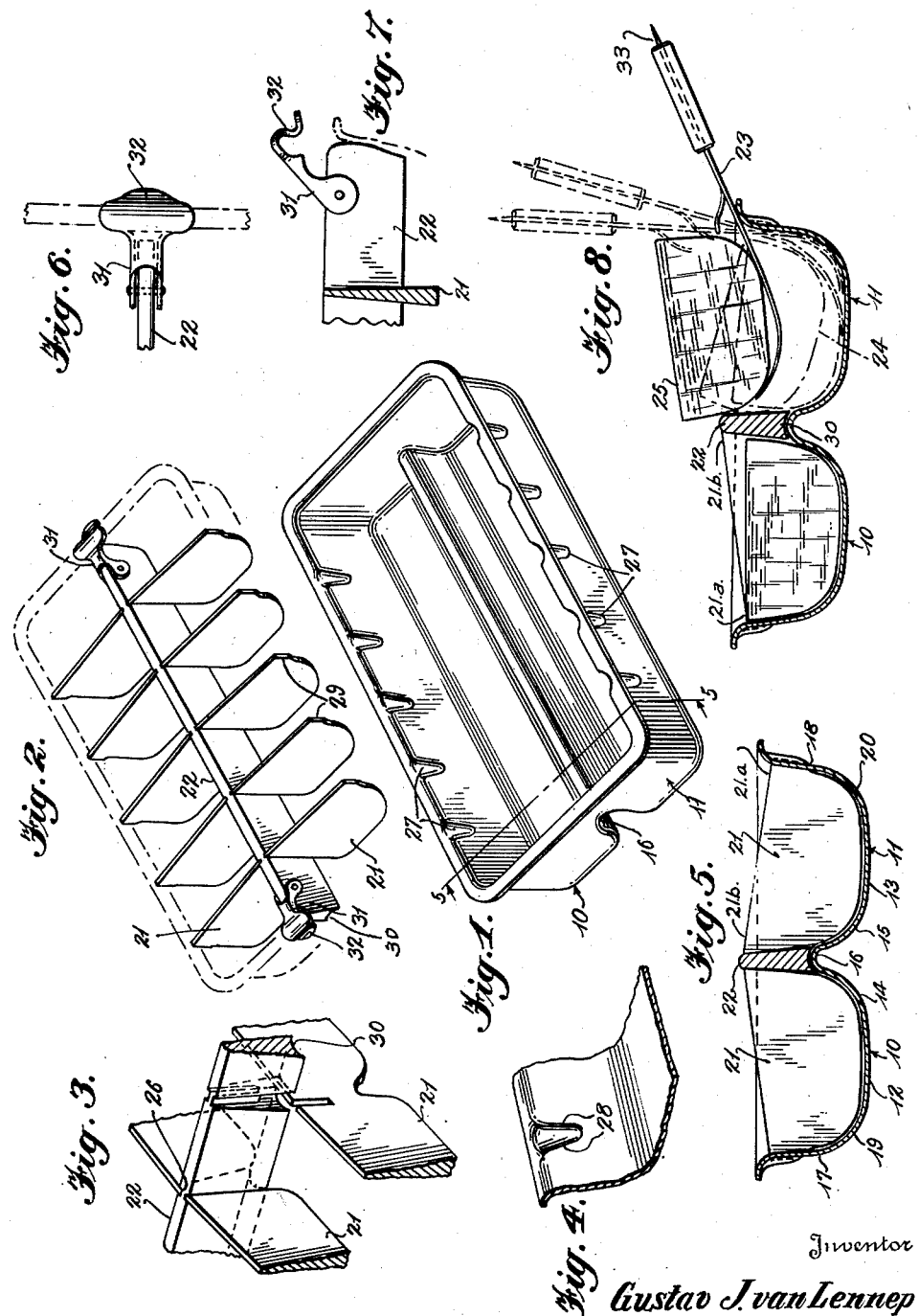

2,531,714

UNITED STATES PATENT OFFICE 2,531,714

ICE TRAY

Gustav J. van Lennep, Washington, D. C.

Application June 14, 1946, Serial No. 676,822

6 Claims. (Cl. 62—108.5)

The invention relates to ice trays and has as an object the provision of an improved form of tray to be filled with water and inserted in a household refrigerator freezing compartment for production of ice cubes.

It is an object to provide a form of tray that will facilitate and improve the sanitation of removal of cubes from the tray.

It is a further object to provide a tray that will mold ice cubes in a form to be more readily removable while freezing more quickly than comparable cubes as formed in known trays.

It is a further object to provide a tray having a form that will facilitate and speed defrosting for removal of cubes.

It is a further object to provide a tray which because of its form may be readily pried loose from the shelf upon which it rests in the freezing chamber.

It is a further object to provide a tray having a removable grid with latch means to hold the grid in the tray while inverted for defrosting.

It is a further object to provide a tray having latch means which serve as handles to enable lifting of the grid with or without enclosed ice cubes.

It is a further object to provide a tray having a removable grid and means to space the free ends of the cross members thereof while in the tray.

It is a further object to provide a tray formed to mold cubes shaped to further facilitate removal by the implement disclosed and claimed in my co-pending application, Ser. No. 580,695, now Patent No. 2,419,381, entitled Implement and Method for Removal of Ice Cubes from Trays.

Other objects will appear from the following description when read in connection with the accompanying drawings, in which:

Figure 1 is a perspective view of a tray of the invention;

Fig. 2 is a perspective view of a grid of the invention;

Fig. 3 is a detail perspective view of portions of the grid showing the manner in which the parts are joined together drawn to an enlarged scale;

Fig. 4 is a detail perspective view of a portion of a side wall of the tray;

Fig. 5 is a cross section on line 5—5 of Figure 1 viewed in the direction of the arrow;

Fig. 6 is a detail plan view upon an enlarged scale of a latch member;

Fig. 7 is a detail side elevation of a portion of the central rib of the grid of the invention showing a portion of the lateral members of the grid in section and the latch of the invention; and Fig. 8 is a section similar to Fig. 5 illustrating the manner of removing a cube from the tray by use of the implement of my Patent No. 2,419,381.

As shown the tray body is formed with a plurality of side portions 10 and 11, each having a longitudinally extending portion of its bottom as at 12, 13 occupying a common plane surface whereby these portions of the bottom of the tray may contact the floor of a freezing compartment of a refrigerator.

Joining the plane portions 12 and 13 in arcuate walls 14, 15, Figs. 5 and 8, is a central rib portion 16 providing a groove in the bottom of the tray as seen from the exterior and a corresponding ridge within the tray.

The outer side walls 17, 18, Fig. 5, of the tray flare upwardly and outwardly and are shown as united to the portions 12, 13 by means of arcuate portions 19, 20.

The resulting cubes when frozen in the tray divided from each other by means of the laterally extending walls 21 and by the longitudinally extending wall 22 provide a cube of form illustrated in Fig. 8 and due to the arcuate portions which are frozen in contact with the portions 14, 15, 19, 20 of the tray when the implement 23 is forced between the wall of the tray and the ice, the cube is permitted to first lift and then to roll to the position shown by dot and dash lines at 24 to the position shown in section at 25, Fig. 8, from which it may be conveniently removed for use. Obviously, due to the arcuate construction of the bottom walls of the tray and the slippery nature of the ice, when the tray is defrosted, with a light pressure at their longitudinal end, the ice cubes will roll over and optionally thereby be easily extracted by hand from the tray.

The grid of the invention comprising the longitudinal member 22 and the lateral members 21 are joined in the manner shown in Fig. 3.

After the parts so formed are assembled they are desirably prevented from disassembly by simply peening the metal as at the point 26, Fig. 3. However, when so secured, the cross members are still subject to some movement relative to the central rib member 22. To insure that the cross members 21 shall be parallel with each other when in place in the tray and so provide for an easier lifting or removal of the cubes, the side walls of the tray are shown as formed with outwardly deformed portions 27 which as clearly shown in Fig. 4 provide depressions with downwardly converging side walls 28 to the end that when the grid is placed in the tray with the projecting portions 29 carried by the edges thereof entering the depressions 27 each will be guided to a position of true parallelism with the remaining thereof by the said converging walls.

The rounded shape of the corners of the walls of the depressions 27 with their upward flare also has the advantage that the resulting depressions are more easily cleaned than if they were merely wide enough to receive the thickness of the projections 29.

The central rib 22 is shown as formed with a downwardly facing longitudinal transversely arcuate portion 30 clearly shown in Figs. 3, 5 and 8, to conform to the upper surface of the portion 16 both the longitudinal rib 22 and the transverse or laterally extending grid cross members 21 are made thickest at their lower edges which form greatly facilitates the removal of the cube in the manner shown in Fig. 8.

The common method of defrosting ice cube trays when filled with cubes is to hold the same in inverted position in the path of running water, supporting the inverted assembly by hand in contact with the upper surface of the ice and grid. The grid of the invention herein is shown as provided with latches 31 over the edge of the tray as shown in dotted lines in Fig. 7. When so assembled the tray may be held by its edges while being subjected to the defrosting action of a stream of water without contact of the hands with the ice and when the ice has become detached from the tray the assembled cubes and grid will be supported by the latches providing thereby a sanitary and more pleasant defrosting procedure. For convenience the latch is, as shown in Fig. 7, so formed as to have a loose connection with the edge of the tray, as a result of which the ice assembly with the grid will drop slightly away from the tray when it is sufficiently loosened, whereupon the tray may be turned right side up and the portions 32 of the latches may be grasped to unlatch the grid from the tray and may serve also conveniently as handles in the sanitary lifting of the grid and cubes out of the tray. It is obvious that the latch 31, 32 may be rigid with the central rib 22 and still perform the function desired.

As shown particularly in Fig. 5, the cross members 21 of the grid slope upwardly from their outer ends at 21a to their junction with the central rib 22 at 21b thus extending above the upper surface of the walls of the tray which structure results in exposed surfaces of the grid thereby assisting in the gauging of the water level when the tray is filled and which exposed surfaces as shown at 21b, Fig. 5, assist in the heat conduction by contact with water in which the tray and ice is immersed for defrosting purposes or with water which is allowed to flow over the assembly, greatly facilitating the process of defrosting. Another object in the extension of the grid member over the upper edges of the tray (upper margins) is to provide for a more substantial build-up for the same at its interlocking connections with its cross members 21 over and above groove 16 of the tray.

It is obvious that the adhesion of the cubes to the central ribs and to the ends of the cross members adjacent is the portion most difficult to defrost because they are entirely surrounded with ice. The exposure of the upper edge of the central rib and the points 21b of the cross members to defrosting water aids in such defrosting, and the water being pocketed between the walls will infiltrate around the cubes.

It is to be understood that the tray may be made to provide for more than two rows of cubes, and as many as three or four are contemplated by the invention. Particularly when as many as three rows are frozen the central grooves, as seen from the exterior, provided by the portions 16 of the tray, become very important both in freezing and in defrosting. The air in the freezing chamber of the refrigerator is allowed to flow through the groove or grooves thus exteriorly provided, and thereby greatly speeds the freezing process. A further advantage of the grooves 16 is to provide additional defrosting surface.

While the latches are shown at 31, 32 as preferred, upon the end of the longitudinal rib they may be placed upon chosen ones of the cross ribs if desired. In the event three or four row trays are used, the latches may be provided upon the ends of a center rib or a plurality of longitudinal ribs and their outer latching or snapping portion may be joined together in an obvious manner.

At 33, Fig. 8, the implement is shown as formed with a projecting metallic member which is serviceable in prying or wedging the cubes finally loose in the compartment of the grid in case the defrosting has not been quite complete.

Minor changes may be made in the physical embodiments of the invention within the scope of the appended claims without departing from the spirit of the invention.

I claim:

1. An ice cube tray structure comprising, in combination: a tray body; a removable grid fitting in said body and comprising at least one longitudinal rib member rising to a level above the margins of the tray side walls; and partition members extending transversely from said rib member with their upper edges substantially registering with the upper edge of said rib member and sloping downwardly therefrom to a level closely adjacent to the level of the said margins the upper edges of said partition members being freely exposed throughout for contact with defrosting fluid.

2. An ice cube tray structure comprising, in combination: a tray body; a grid assembly fitting in and removable from said body and comprising longitudinal and transverse partition members; said transverse members each projecting from and rigid with a longitudinal member and formed with integral tabs projecting laterally from their free ends adjacent their upper edges and received between the sides of the tray body; said tray body formed with inwardly opening depressions at the upper margins of its side walls exclusive of the tray body ring to receive and locate said tabs.

3. The structure of claim 2 in which said tab receiving depressions each flare upwardly from their lower portions to guide the tabs when the grid assembly is placed in the tray.

4. An ice cube tray structure comprising, in combination: a tray body; a grid assembly fitting in and removable from said body and comprising longitudinal and transverse partition members; said transverse members each projecting freely from a longitudinal member and formed with integral tabs projecting laterally from their free ends adjacent their upper edges; and means to anchor the ends of said transverse members to the body of the tray to preserve the relative spacing thereof.

5. An ice cube tray comprising: a tray formed with at least one interior rib upstanding from its bottom wall and rising to a height below the upper margins of the side walls of the tray body; a removable cube molding grid fitting within said body and having a partition rib member contacting the crest of said interior rib and other partition members extending transversely from said first named partition rib member and from the bottom of the tray to a level adjacent said upper margins of the side walls of the tray body; said interior rib and said partition rib member each upwardly diminishing in thickness, the thickness of the lower edge of the partition rib member being substantially equal to the thickness of the upper edge of the interior rib whereby to provide substantially continuous side surfaces of said rib member throughout the depth of the tray.

6. An ice cube tray structure comprising, in combination: a tray body formed with at least one exterior groove providing an interior rib upstanding from its bottom wall, the sides thereof converging to a height below the upper margins of the side walls of the tray body to a substantially straight crest extending from end to end of the tray; a removable cube molding grid fitting within said body and having a partition rib member contacting the crest of said interior rib and other partition members extending transversely from said first named partition rib member and from the bottom of the tray to a level adjacent said upper margins of the side walls of the tray body, said partitions diminishing in thickness from their lower to their upper edges.

GUSTAV J. van LENNEP.

REFERENCES CITED

The following references are of record in the file of this patent:

UNITED STATES PATENTS

| Number | Name | Date |
|---|---|---|
| 1,407,614 | Wicks | Feb. 21, 1922 |
| 1,717,857 | Spreen | June 18, 1929 |
| 1,912,065 | Buchanan | May 30, 1933 |
| 2,023,923 | Harbordt | Dec. 10, 1935 |
| 2,045,371 | Roberts | June 23, 1936 |
| 2,168,200 | Geyer | Aug. 1, 1939 |
| 2,190,610 | Reeves | Feb. 13, 1940 |
| 2,212,425 | Miner | Aug. 20, 1940 |
| 2,265,705 | Steenstrup | Dec. 9, 1941 |
| 2,320,534 | Osborn | June 1, 1943 |
| 2,362,320 | Steenstrup | Nov. 7, 1944 |